Patented Sept. 25, 1928.

1,685,191

UNITED STATES PATENT OFFICE.

KARL DOBMAIER, OF LEVERKUSEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY.

MANUFACTURE OF SOLID ALKALI METAL SALTS OF ORGANIC COMPOUNDS.

No Drawing. Application filed January 19, 1928, Serial No. 248,004, and in Germany January 18, 1927.

The present invention concerns the manufacture of solid alkali metal salts of organic compounds and consists in the treatment of the respective compounds with the alkali salts of hyrdoxylated aromatic bodies or derivatives and substitution products thereof.

The manufacture of the sodium salts of organic compounds in the solid state is occasionally very difficult. This is particularly the case with those compounds, the sodium salts of which are easily soluble, or which are sensitive to alkali or which on concentration or drying at elevated temperatures tend to decompose. Foremost in this connection must be mentioned the organic metallic compounds, such as for example, mercury phenols, mercury phenol complex salts, mercury-dihydroxycarboxylic acids, organic arsenic, antimony and phosphorous compounds and many others.

Hitherto it has only been possible to obtain the respective sodium salts by cautious evaporation at a low temperature and high vacuum, or the products not containing alkali have been converted into mixtures of sodium salts, the so-called alkali complex salts, which were generally products soluble in water.

In accordance with the present invention the alkali metal salts of organic compounds can be produced quite generally and in a simple and convenient manner by intimately grinding the substances which it is intended to transform into solid alkali salts with the alkali salts of hydroxylated aromatic bodies. In this technically very simple manner the alkali metal salts of complex organic compounds are thus obtained in a comparatively short time at ordinary temperature with a high degree of purity, without any loss of material and with the avoidance of the expensive vacuum distillation.

It is likewise a great advantage in the manufacture of the alkali metal salts of organic compounds which are in themselves easily accessible in that the handling of large quantities of liquid can be dispensed with, whereby a considerable saving of time is effected.

The following examples will illustrate my invention—

*Example 1.*—15 parts by weight of chlorobenzoic acid are intimately ground with 12 parts by weight of sodium phenolate with the addition of from ½ to 1 part by weight of water until the mixture feels moist and glutinous. The whole is then extracted with ether, filtered and again washed or decanted with ether in order to remove the smell of phenol. Sodium chlorobenzoate remains, the yield being quantitative.

*Example 2.*—When the sodium phenolate in Example 1 is replaced by the corresponding molecular proportion of sodium-β-naphtholate sodium chlorobenzoate is likewise obtained with a theoretical yield.

*Example 3.*—17.4 parts by weight of para-nitrophenol mercury

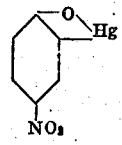

containing 59.18% of mercury are intimately ground with 10 parts by weight of sodium phenolate. After a short time the color commences to change to orange-red. After extraction with ether or alcohol the sodium salt of para-nitrophenol mercury remains behind with a quantitative yield.

*Example 4.*—When the para-nitrophenol mercury in Example 3 is replaced by cresol-mercury-cyanide, containing 69.62% of mercury, the easily soluble sodium salt of cresol-mercury-cyanide, is obtained in the same manner.

*Example 5.*—Corresponding molecular quantities of nitro-phenyl-stibinic acid and sodium phenolate are decomposed according to the directions of Example 1, when the greenish-black sodium salt is obtained. By distilling the ethereal or alcoholic extracts the phenol is recovered quantitatively, so that no loss of material takes place at all.

I claim:—

1. In the process for the manufacture of solid alkali metal salts of organic compounds, the step which comprises treating the organic compounds with the alkali metal salts of hydroxylated aromatic bodies.

2. In the process for the manufacture of solid alkali metal salts of para-nitrophenol mercury, the step which comprises treating the para-nitrophenol mercury with the alkali metal salts of hydroxylated aromatic bodies.

3. In the process for the manufacture of solid alkali metal salts of para-nitrophenol-mercury, the step which comprises treating the para-nitrophenol-mercury with an alkali metal phenolate.

4. In the process for the manufacture of the solid sodium salt of paranitrophenol-mercury the step which comprises treating the para-nitrophenol-mercury with sodium phenolate.

In testimony whereof I have hereunto set my hand.

KARL DOBMAIER.